UNITED STATES PATENT OFFICE.

DAVID W. HUDSON, FRANK LA STRONG, AND GEORGE D. BUNCH, OF LOS ANGELES, CALIFORNIA.

MANUFACTURE OF BUTTER.

SPECIFICATION forming part of Letters Patent No. 489,814, dated January 10, 1893.

Application filed March 14, 1892. Serial No. 424,891. (No specimens.)

*To all whom it may concern:*

Be it known that we, DAVID W. HUDSON, FRANK LA STRONG, and GEORGE D. BUNCH, all of Los Angeles, in the county of Los Angeles and State of California, have invented a new and useful Improvement in the Manufacture of Butter, of which the following is a full, clear, and exact description.

This invention consists in a new and useful composition of matter, the same forming, as a new article of manufacture, an improved composition butter, which is free from all deleterious chemical and other like substances, is mainly composed of pure or ordinarily made butter, which it largely increases the bulk or weight of and consequently lessens the cost thereof to the consumer, without destroying or injuring in any way the original virtues of the pure or ordinarily made butter, and is highly preservative and healthy.

The composition consists of the following ingredients which are purely animal and vegetable, in or about the proportions stated, viz: One pound of pure or ordinarily churned or made butter; and three-quarters of a pound of sweet milk, and fifteen drops of cocoanut oil worked into and incorporated with the original or pure butter; thus making of the whole fully one and three-fourths pounds for, or as compared with one pound of original or pure butter. We do not, however, confine ourselves to the exact proportions of the ingredients herein named, as those may be more or less varied without injury to the mass as a whole.

To make the composition butter, we first mix the milk, cocoanut oil, and preferably a few drops of suitable coloring matter, to give color to the whole, together; then cut the pure butter up into small pieces and place it in a churn, then add the other ingredients and churn the whole together at a temperature of about 62° Fahrenheit, and continue to churn until the liquid ingredients are absorbed by the pure butter.

We are aware that it is not new to increase the bulk of butter by incorporating with it a proportion of sweet milk, and we make no claim to this broadly, but only when combined with cocoanut oil which acts as a binder to cause the absorption of the milk by the butter. The cocoa nut contains the same oil globules and also the casein found in cows milk, and in adding three fourths of a pound of milk to one pound of butter, we have found that a certain amount of oil of the same quality causes the butter to absorb and hold the milk as a stable homogeneous mixture, and the fifteen drops of cocoanut oil we find sufficient for the purpose.

The special effect the oil has on the butter and milk is, first it solidifies the milk with the butter, and, second it preserves the same. We have butter made by this process which is nine months old, and which is as fresh as when made and of fine flavor and consistency. The cocoa nut oil being a vegetable product instead of animal it is free from the objections that result from the admixture of animal fats.

Having thus described our invention what we claim as new, and desire to secure by Letters Patent, is—

As a new article of manufacture, the within described butter made up of pure butter, sweet milk and the oil of cocoanut, substantially as specified.

DAVID W. HUDSON.
FRANK LA STRONG.
GEORGE D. BUNCH.

Witnesses:
   JAN L. CLARKE,
   EDWARD P. TOMPKINS.